3,257,408
2-METHYL-3-HYDROXY-4-CYANO-5-HYDROXY-METHYLPYRIDINE

Tetsuo Maruyama, Osaka, Mikio Yasumatu, Nishinomiya, and Eiichi Araki, Noriaki Toukai, and Kunimitsu Kurizono, Suita, Japan, assignors to Takeda Chemical Industries, Ltd., Osaka, Japan
No Drawing. Filed May 20, 1964, Ser. No. 369,016
Claims priority, application Japan, May 22, 1963, 38/26,963
1 Claim. (Cl. 260—294.9)

The present invention relates to 2-methyl-3-hydroxy-4-cyano-5-hydroxymethylpyridine which is useful for producing pyridoxamine and salts thereof. The novel compound of the invention is producted by reacting γ-hydroxycrotononitrile with a compound of the formula:

(I)

wherein R is an alkyl, an aralkyl or an aryl group. The thus produced compound of the invention can be reduced to form pyridoxamine.

Heretofore, certain methods have been proposed for the production of pyridoxamine and pyridoxine (vitamin $B_6$). Nevertheless, research still continues in an effort to develop more satisfactory methods.

The present inventors have found that pyridoxamine can be produced profitably from an industrial point of view by preparing, 2-methyl-3-hydroxy-4-cyano-5 - hydroxymethylpyridine by reacting a compound (I) mentioned above with γ-hydroxycrotononitrile, and subsequently reducing the thus-obtained compound of this invention.

It is an object of the present invention to provide 2-methyl-3-hydroxy-4 - cyano-5 - hydroxymethylpyridine whereby pyridoxamine and salts thereof can be produced in a very good yield.

Other objects and advantages will become apparent from the following description and the working examples.

Pyridoxamine or its salts are prepared by reacting γ-hydroxycrotononitrile with a compound of the aforesaid Formula I to form 2-methyl-3-hydroxy-4-cyano-5-hydroxymethylpyridine, and subsequently reducing the compound, to form pyridoxamine or its salts. The last step can be carried out by methods per se well known in the art, for example in the presence of a catalyst available for hydrogenation, such as nickel series, palladium series, copper, iron, cobalt and platinum, or in the presence of a reducing agent such as lithium aluminum hydride.

A starting material of the present invention is γ-hydroxycrotononitrile, and another starting material of the present invention is the compound of the aforesaid Formula I.

As the group which is designated by R in the Formula I, and any alkyl, aralkyl or aryl group may be employed although lower alkyl such as methyl, ethyl, propyl and butyl, benzyl, phenyl, etc. is preferably employed.

A reaction solvent is not always necessary, for both of the starting materials may be used as a reaction solvent, but, if desired, any solvent may be used unless the reaction is thereby hindered. As occasion demands, an anti-oxidant such as hydroquinone may be added to the reaction system in order to protect oxazole or nitrile of the starting material from decomposition.

Other conditions such as reaction temperature and reaction time, are selected according to the amount of the starting materials. Generally, in the present invention, the reaction time is reduced by heating.

The resulting product is 2-methyl-3-hydroxy-4-cyano-5-hydroxymethylpyridine. When the present reaction is considered from the viewpoint of reaction mechanism, it would be expected that 2-methyl-3-hydroxy-4-hydroxymethyl-5-cyanopyridine is also produced by the present condensation reaction. However, 2-methyl-3-hydroxy-4-hydroxymethyl-5-cyanopyridine is not produced, but only 2-methyl-3-hydroxy-4-cyano - 5 - hydroxymethylpyridine. Such a fact is very interesting from the viewpoint of both the reaction mechanism and the practical use of the resulting compound.

The resulting compound in the reaction mixture need not be separated since the reaction mixture can directly be reduced. However, the compound may be separated from the reaction mixture, if necessary. For the separation, it is preferred to separate the compound in the form of a salt, preferably in the form of the hydrochloride salt by the addition of alcohol containing hydrochloric acid to the reaction mixture. The reduction reaction may be conducted by any of a number of known methods. Among such methods can be mentioned the reaction whereby the reduction of the compound is conducted in the presence of a catalyst available for hydrogenation, such as nickel series, palladium series, copper, iron, cobalt, platinum, etc., the reaction whereby the reduction is carried out by using a reducing agent such as lithium aluminum hydride. The reduction reaction is carried out in a suitable solvent. Among the solvents which are frequently employed for the present reduction, there may be enumerated alcohols such as methanol and ethanol, hydrocarbons such as benzene, toluene and hexane, ethers such as diethylether and dioxane, or esters such as ethyl acetate and methyl acetate. The reduction proceeds smoothly under atmospheric pressure at room temeprature, but, if desired, the reduction may be accelerated by heating and/or using an elevated pressure. For the reducing nitriles, often ammonia, alkali hydroxides or salts of alkali metal are added to the reaction system. These procedures may also be applicable to the present reduction with favourable results.

If the thus obtained pyridoxamine is in the free form, it may, if desired, be converted to the salt form such as hydrochloride by means per se well known in the art.

Pyridoxamine obtained by the present invention can, if desired, be converted to pyridoxine (vitamin $B_6$) by the diazotization reaction.

The diazotization can be carried out by means per se well known in the art, for example by the method in which an aqueous solution of sodium nitrite is added to a solution of pyridoxamine or its salt in hydrochloric acid. The resulting diazonium salt may be converted to pyridoxine or its salt by hydrolyzing.

As detailed above, pyridoxamine can be obtained under very moderate conditions, and the reaction completed in a short period of time. Moreover, pyridoxine is obtained in a high purity and in good yield. Also, since the reaction mixture resulting from the reaction of γ-hydroxycrotononitrile with a compound of the foregoing Formula I can directly be followed by reduction without separation of 2-methyl-3-hydroxy-4-cyano-5-hydroxymethylpyridine from the mixture, pyridoxamine and the salts thereof can be obtained in a good yield.

The following examples represent presently-preferred illustrative embodiments of the invention.

Example 1

To a solution of 9.7 grams of γ-hydroxycrotononitrile and 10.4 grams of 4-methyl-5-ethoxyoxazole in 50 milliliters of benzene was added 0.2 gram of hydroquinone. After the mixture was heated at 70° C. for 9 hours, it was left standing overnight, and then after the addition of 10 milliliters of 10% hydrochloric acid-ethanol, it was further left standing for one hour. Sixty milliliters of acetone was added to the mixture and the resulting crystals were filtered out and dried.

The obtained crystals were dissolved in 330 milliliters of methanol. After 8 grams of palladium-active carbon (10%) was added to the solution, it was stirred in an atmosphere of hydrogen gas. In about 1.5 hours 1790 milliliters of hydrogen gas was absorbed. To the obtained reaction mixture in which the used catalyst was removed by filtration was added a hydrogen chloride methanol solution and then methanol was evaporated to produce 9.6 grams of crude crystals melting at 223° C.

The obtained crystals were treated with methanol and ethanol to produce 7.8 grams of pyridoxamine dihydrochloride. The product melts with decomposition at 225–226° C.

Example 2

To a solution of 5.1 grams of γ-hydroxycrotononitrile and 3.7 grams of 4-methyl-5-butoxyoxazole in 15 milliliters of benzene was added 0.1 gram of hydroquinone. The mixture was left standing for five days.

The resulting crystals were dissolved in methanol, and the solution was stirred in the atmosphere of hydrogen gas (50 kilograms per square inch at the initial stage) in the presence of Raney nickel for 1.5 hours.

After the used Raney nickel was removed from the reaction mixture by filtration, a hydrogen chloride methanol solution was added thereto, then the mixture solution was concentrated and dried. The residue was recrystallized from a mixture of methanol and ethanol to obtain pyridoxamine dihydrochloride.

Example 3

To a solution of 1 gram of pyridoxamine hydrochloride obtained in Example 1 dissolved in 13 milliliters of 1 N hydrochloric acid was added a solution of 0.4 gram of sodium nitrite dissolved in 3 milliliters of water. The mixture was heated at 80–90° C. for 30 minutes. After completion of the reaction urea was added to the reaction mixture to decompose the excess sodium nitrite. The obtained mixture was concentrated and dried. The residue was extracted with ethanol. The ethanol solution was distilled to remove the solvent. The residue was recrystallized from ethanol to produce, as pure product, pyridoxine melting at 205–207° C.

Example 4

In a manner similar to that described in Example 3, pyridoxamine hydrochloride obtained in Example 2 was treated to produce pyridoxine melting at 205–206° C.

Having thus disclosed the invention, what is claimed is:
2-methyl-3-hydroxy-4-cyano-5-hydroxymethylpyridine.

References Cited by the Examiner

Harris et al.: Journal of Organic Chemistry, vol. 27 (1962), pp. 2705–6.

Noller: Chemistry of Organic Compounds, Saunders, 2nd ed. (1957), p. 806.

WALTER A. MODANCE, *Primary Examiner.*

A. L. ROTMAN, *Assistant Examiner.*